United States Patent [19]

Grashow

[11] Patent Number: 4,482,122

[45] Date of Patent: Nov. 13, 1984

[54] AUTO ANTENNA MOUNTING

[75] Inventor: Joseph Grashow, Nanuet, N.Y.

[73] Assignee: Quick-Mount Manufacturing Company, Inc., Brooklyn, N.Y.

[21] Appl. No.: 472,195

[22] Filed: Mar. 4, 1983

[51] Int. Cl.$^3$ .............................................. F16M 13/00

[52] U.S. Cl. ..................................... 248/514; 248/291

[58] Field of Search ............... 248/514, 278, 104, 106, 248/276, 279, 282, 283, 122, 285, 662, 274, 291; 403/71, 97

[56] References Cited

U.S. PATENT DOCUMENTS

| | | | |
|---|---|---|---|
| 623,790 | 4/1899 | Kenyon | 248/282 X |
| 2,833,849 | 5/1958 | Abel | 248/514 X |
| 3,423,057 | 1/1969 | Iverson | 248/285 X |
| 3,602,466 | 8/1971 | Drowns | 248/514 |
| 3,889,908 | 6/1975 | Larson | 248/278 X |

*Primary Examiner*—J. Franklin Foss

*Attorney, Agent, or Firm*—Brumbaugh, Graves, Donohue & Raymond

[57] ABSTRACT

A ball and socket-type antenna mount includes a base, and an upright support plate extending from the socket. An antenna support is receivable in the socket and has a planar surface portion engageable with the plate to be pivotable in an upright plane. A plurality of V-shape teeth are arranged on the planar surface of the antenna support, and disposed annularly about the pivot axis. The teeth define radially extending recesses. A radially extending, V-shaped projection is formed on the plate and arranged to be received in the recesses between the teeth on the antenna support, to lock the antenna support at a selected angular position relative to the base.

8 Claims, 6 Drawing Figures

AUTO ANTENNA MOUNTING

BACKGROUND OF THE INVENTION

The present invention is an antenna mounting, particularly for use on automobiles, in which the antenna support may be pivoted, in an upright plane, relative to the base, and locked so that the antenna rod is vertical.

In automobile antenna mountings, the antenna rod extends from a base, which is attached to the automobile body. Depending upon where it is mounted, the antenna may not always be upright. It is therefore necessary to provide a means to correct the vertical position of the antenna rod.

My prior U.S. Pat. No. 4,136,986 discloses one such structure, in which the antenna mount base is adjustable to move the antenna to the proper upright position. In another type of antenna mount, the base itself is fixed, but the antenna is pivotable, in a vertical plane, relative to the base. In such a construction, the base includes a socket and a support plate extending upright from the socket. An antenna support is partially spherical, so as to be receivable in the socket, but has a planar surface portion which abuts the support plate. In such an arrangement, the antenna support, from which the antenna rod extends, is pivotable in the socket, about an axis perpendicular to its planar surface portion.

In this known ball and socket-type mounting, the planar surface portion of the antenna support has a plurality of V-shaped, projecting teeth, arranged annularly about the pivot axis. On the opposing surface of the support plate, a plurality of small projections are formed, also in an annular pattern so that the recesses formed between adjacent projections cooperate with the antenna support to receive the teeth thereof. Thus, the teeth and recesses are arranged to mate, with the ends of the V-shaped teeth received between projections, such that the antenna support may be locked at a selected angular position. After the antenna and antenna support are rotated to the desired angle relative to the socket, the antenna support and support plate are locked together by a screw.

In order to ensure the proper mating of parts, the recesses formed on the flat surface of the support plate must be precisely located relative to the socket and to the pivot axis, so that such recesses are concentric about a common pivot axis and thereby aligned with the teeth of the antenna support. If the recesses are formed off-center, slippage can occur between parts, such that the antenna does not remain upright. Also, where the teeth and recesses are slightly misaligned, excess play or slippage can develop between the antenna support teeth and the base support plate after a period of use. The need for such precision renders the manufacture of such parts more difficult, and the incidence of rejects, where the recesses are formed off-center, is increased.

SUMMARY OF THE INVENTION

The present invention is an antenna mount of the type in which a base includes a socket for pivotably receiving and supporting the antenna, but which is improved in construction as compared with conventional ball and socket-type antenna mounts.

More particularly, the present invention is an antenna mount of the type described above, in which the base includes a socket and a support plate extending upright from the socket. An antenna support is receivable in the socket and has a planar surface portion which engages with the upright support plate such that two generally planar surfaces oppose each other. The antenna may be pivoted in the socket, about a pivot axis perpendicular to the planar surfaces.

One of the planar surfaces, for example, the planar surface of the antenna support, has a plurality of teeth or other projections which are annularly arranged about the pivot axis and which define an annular pattern of recesses. The other planar surface has a second projection which extends radially relative to the pivot axis, and preferably extends along a line passing through the pivot axis and has portions disposed on either side of the pivot axis. The second projection is arranged to be received in diametrically opposed recesses on the other mount surface. Preferably, the second projection and the recesses have cooperating shapes, and the second projection is arranged on the base support plate to extend parallel to the central axis of the socket. The planar mounting surfaces are also parallel to a plane through the central socket axis.

For a better understanding of the invention, reference is made to the following detailed description of a preferred embodiment, taken in conjunction with the drawings accompanying the application.

DETAILED DESCRIPTION OF A PREFERRED EMBODIMENT

Figure 1:
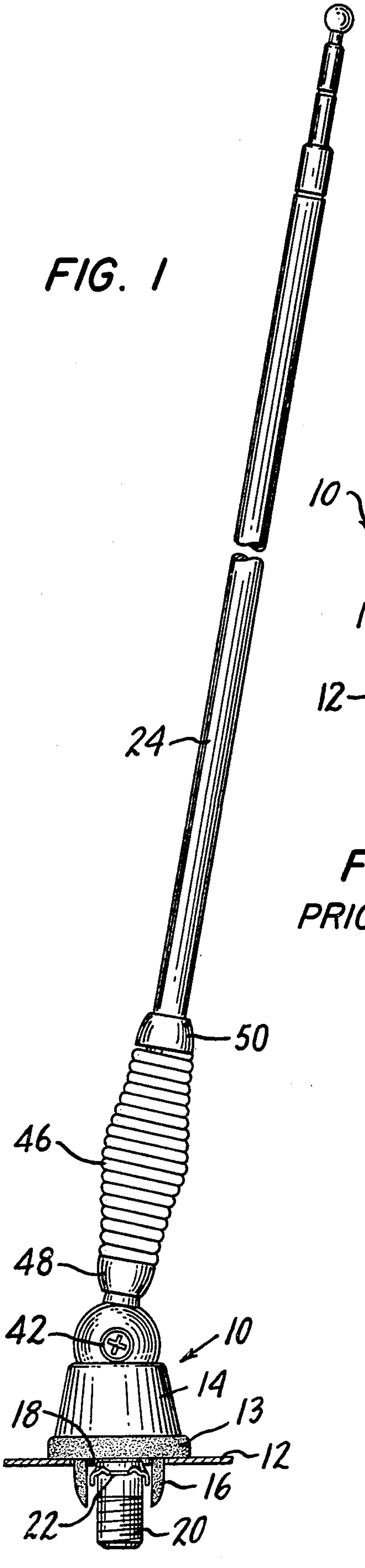
FIG. 1 is a front view of an antenna mount in accordance with the invention, installed in a mounting surface.

Referring to FIG. 1, an antenna mounting 10 is attached to a support surface 12, for example, the sheet metal of an automobile body. The antenna mount 10 has a conducting base 14, which is supported on surface 12 by a washer 13. The washer 13 is made of insulating material. It includes depending flanges 16, which are received in an opening 18 of the mounting surface 12 so as to centrally locate the washer 13 and base 14 relative to the hole 18.

An antenna plug 20 extends through the opening 18, and has a transverse plate 22 to engage the support surface 12 from below. The plug 20 has a hollow bore therethrough, in which is fitted a threaded sleeve 21 of insulating material. The plug 20 is attached to the base 14 by a screw 15, which is received in the threaded sleeve 21 so as to be electrically isolated from the outside casing of the plug 20. By tightening screw 15, the mounting surface 12 is securely clamped between the washer 13 and a plate 22, the latter acting to ground one lead of the antenna cable to the automobile body.

The end of the screw 15, which is disposed in the bore of the plug 20, is formed as a pin, and the antenna plug 20 is provided with threads, such that the pin and outside casing of the plug 20 are adapted to receive a standard connector for an antenna cable (not shown). The cable may be connected to the radio, a CB or the like. The mounting arrangement of the base 14 is conventional, and need not be described further herein.

As shown in FIG. 1, the antenna mount 10 supports an antenna rod 24, which may be connected directly to the antenna mount 10, or may be spring mounted as shown in FIG. 1.

Figure 2:
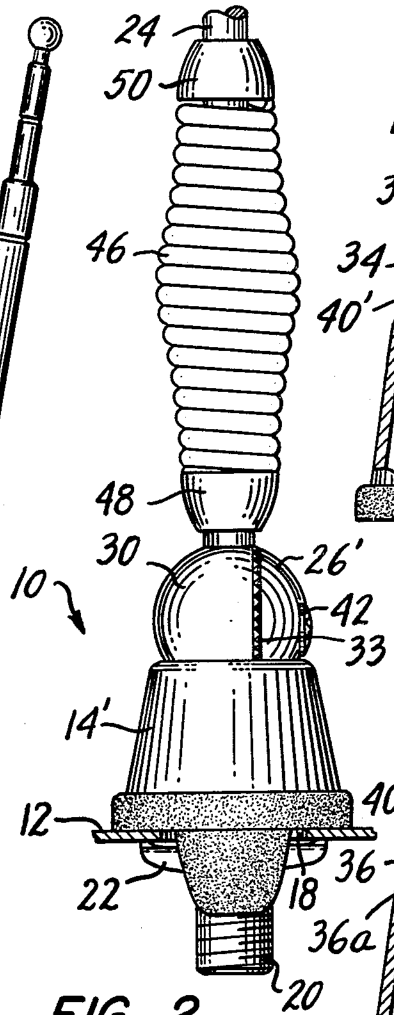
FIG. 2 PRIOR ART
FIG. 2 is a side view of a conventional ball and socket-type antenna mount.
Figure 3:
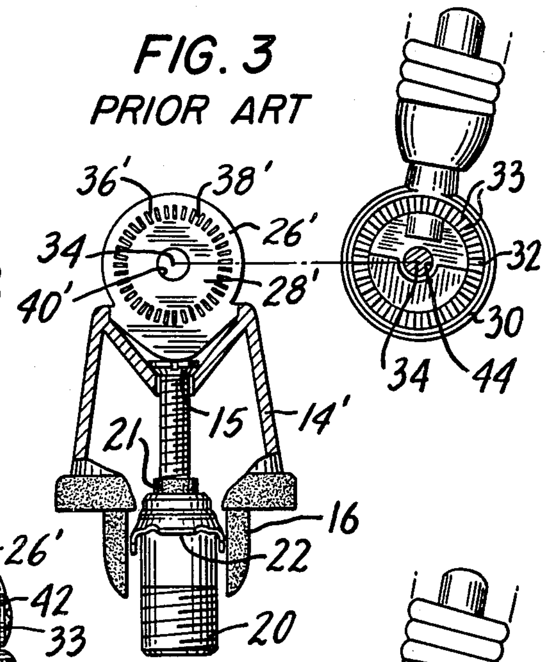
FIG. 3 PRIOR ART
FIG. 3 is a front view of a conventional ball and socket-type antenna mount, with the components partially disassembled.

FIGS. 2 and 3 illustrate a conventional ball and socket-type antenna mount. Such are commonly used in automobile applications for AM/FM radio or CB antenna mountings, and establish electrical contact between an antenna cable and the antennna rod 24.

Figure 6:
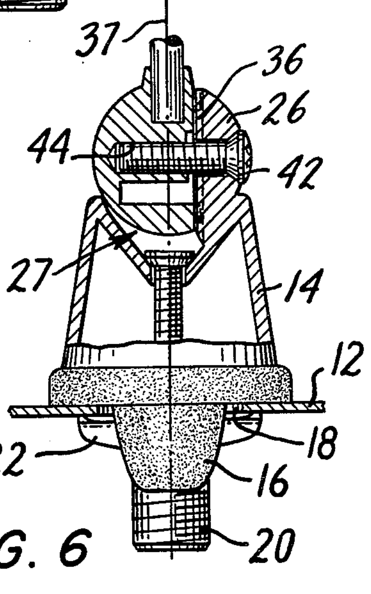
FIG. 6 is a side, sectional view of the antenna mount of the present invention, taken through lines 6—6 of FIG. 5.

The base 14' defines a socket (which can be seen most clearly in FIG. 6, illustrating the present invention, wherein the socket is designated as 27). A support plate 26' extends upright from the socket and has a planar surface 28'.

A generally spherical antenna support 30 is receivable in the socket and has a planar surface portion 32 engageable with the first planar mounting surface 28. The planar surface portion 32 is formed by a plurality of projecting, V-shape teeth 33. The teeth 33 are annularly disposed about the pivot axis 34 of the antenna support 30.

As used herein, the term "planar surface portion" or the like refers to each of two opposing sections, e.g. 32 and 28', lying generally in a plane, which provide contact surfaces between the ball and socket elements, e.g. 30 and 26', to permit pivoting between the elements in such plane. As shown, section 32 need not be flat, and in fact the edges of teeth 33 define the contact plane.

The upright support plate 26' has a plurality of small projections 36' on the surface 28' spaced annularly about the pivot axis 34. The spaces between the projections 36' act as recesses 38' to receive the projecting teeth 33 of the antenna support 30.

As shown in FIGS. 2 and 3, a hole 40' is formed in the support plate 26' to receive an attachment screw 42. The screw 42 extends through the hole 40' into a threaded recess 44 in the antenna support 30. When installing the antenna, the antenna support 30 is positioned in the socket. With screw 42 loosened, the antenna rod 24 may be rotated to an upright angle. The screw 42 is thereafter tightened, such that teeth 33 and recesses 38' mate, to lock the members 26' and 30 in position.

As discussed above, when the part 14' is fabricated the projections 36' may be formed so that they are not concentric with axis 34. If such occurs, teeth 33 and recesses 38' will not be aligned, and the antenna mounting may not lock in position properly.

In the embodiment shown, a spring 46 is attached at one end to a spring holder 48 on the antenna support 30. At its other end, the spring 46 is attached to a second spring holder 50, which also receives the lower end of the antenna rod 24. However, the rod 24 may be attached directly or in any other suitable fashion to the support 30.

Figure 4:
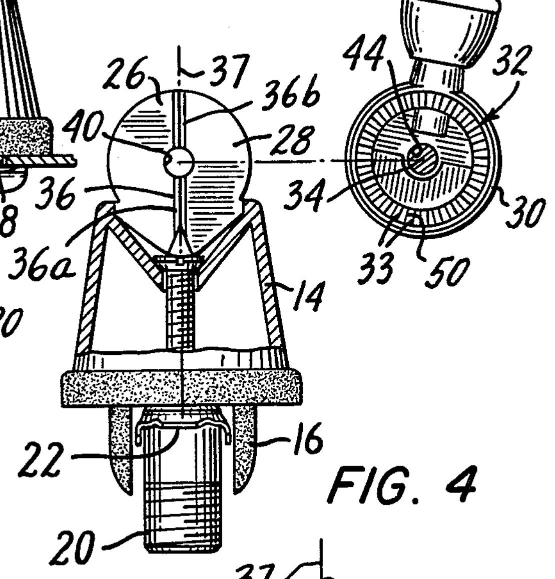
FIG. 4 is a front view, similar to that of FIG. 3, of an antenna mount in accordance with the invention.
Figure 5:
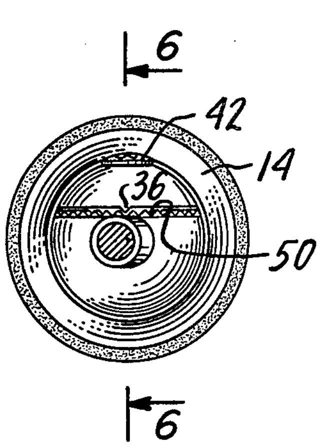
FIG. 5 is a top view of an antenna mount in accordance with the invention.

Referring to FIGS. 4–6, an antenna mount in accordance with the present invention includes a upright support plate 26 and an antenna support 30. The antenna support 30 is similar to that described in connection with FIGS. 2 and 3. A plurality of projecting teeth 33 are formed in an annular pattern about the pivot axis 34, generally in a plane 32. The teeth 33 define an annular pattern of V-shaped recesses.

The support plate 26, which extends from a socket 27 (FIG. 6) has a planar surface 28. A projection 36 on the surface 28 extends radially from both sides of a hole 40, hole 40 being provided to receive the attachment screw 42. As shown, the projection 36, which includes portions 36A and 36B, is parallel to the central socket axis 37. The projection 36 is V-shaped and matched in profile to the V-shaped recesses 50 between the teeth 33 of the antenna support 30.

As illustrated by FIG. 5, when the base and antenna support are assembled, the projection 36 is snugly received in two diametrically opposed recesses 50, one each on opposite sides of axis 34 (one recess receives projection **36*a* and the other receives projection 36*b*). The remaining teeth 33 are flush against the planar surface 28 such that the socket and the abutting surfaces 28, 32, retain the antenna support 30 securely in place (in FIG. 5, a slight gap is shown between teeth 33 and planar surface 28 for clarity; however, in practice the teeth 33 touch the surface 28**).

By loosening the screw 42, the antenna rod 24 may be pivoted to a desired upright angle. Thereafter, the components lock together by tightening screw 42 which, similar to the arrangement in FIGS. 2 and 3, is received in the threaded socket 44. Positive locking between the members 30, 26 is assured.

The foregoing represents a description of a preferred embodiment of the invention. Variations and modifications of the construction shown and described will be apparent to persons skilled in the art, without departing from the inventive concept shown herein. All such modifications and variations are intended to be within the scope of the invention as defined in the following claims.

I claim:

1. In an antenna mount of the ball and socket-type having:

a base, including a socket having a central socket axis, and a support plate, extending from said socket, having a first planar surface portion;

an antenna support receivable in said socket and having a second planar surface portion engageable with said first planar surface portion such that said antenna support may be pivoted in said socket about a pivot axis, said pivot axis being perpendicular to said planar surface portions; and positive engagement means between said first and said second planar surface portions for locking said antenna support at a selected angle relative to said socket;

the improvement wherein said second planar surface portion is formed by a plurality of projecting teeth annularly disposed about said pivot axis, said teeth defining a plurality of recesses therebetween and wherin said positive engagement means comprises said recesses, and a projection, on said first planar surface portion, extending radially relative to said pivot axis, along the line passing through said axis and parallel to said central socket axis, wherein said projection is adapted to be received in a selected recess.

2. An antenna mount as defined in claim 1, wherein said recesses define a plurality of diametrically opposed pairs of recesses, and wherein said projection has portions on either side of said axis to be received in a selected pair of recesses.

3. An antenna mount as defined in claim 2, wherein said second planar surface portion has a plurality of radially extending projections, arranged annularly about said axis, said projections defining said recesses.

4. An antenna mount as defined in claim 3, wherein the projection on said plate, and said recesses, are V-shaped to be snugly fitted together.

5. A ball and socket-type mount comprising:

a base, including a socket having a central socket axis and a support plate, extending from said socket, having a first planar surface portion;

a support member adapted to be received in said socket and having a second planar surface portion engageable with said first planar surface portion such that said support member may be pivoted in said socket about a pivot axis, said pivot axis being perpendicular to said planar surface portions; and positive engagement means between said first and said second planar surface portions for locking said support member at a selected angle relative to said socket, wherein said second planar surface portion is formed by a plurality of projecting teeth annularly disposed about said pivot axis, said teeth defining a plurality of recess therebetween and wherein said positive engagement means comprises said recesses, and a projection, on said first planar surface portion, extending radially relative to said pivot axis, along the line passing through said axis and parallel to said central socket axis, wherein said projection is adapted to be received in a selected recess.

6. A mount as defined in claim 5, wherein said recess define a plurality of diametrically opposed pairs of recesses, and wherein said projection has portions on either side of said axis to be received in a selected pair of recesses.

7. A mount as defined in claim 6, wherein said second planar surface portion has a plurality of radially extending projections, arranged annularly about said axis, said projections defining said recesses.

8. A mount as defined in claim 7, wherein the projection on said plate, and said recesses, are V-shaped to be snugly fitted together.

* * * * *